(12) United States Patent
Kanuri et al.

(10) Patent No.: US 7,002,955 B1
(45) Date of Patent: Feb. 21, 2006

(54) SELECTIVE ADDRESS TABLE AGING IN A NETWORK SWITCH BASED ON APPLICATION STATE DETERMINED FROM A RECEIVED DATA PACKET

(75) Inventors: Mrudula Kanuri, Santa Clara, CA (US); Gopal Krishna, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 892 days.

(21) Appl. No.: 09/519,848

(22) Filed: Mar. 6, 2000

(51) Int. Cl.
*H04L 12/56* (2006.01)

(52) U.S. Cl. .................................................. 370/389
(58) Field of Classification Search ................ 370/235, 370/389, 392, 401–406
See application file for complete search history.

(56) References Cited

U.S. PATENT DOCUMENTS

| | | | |
|---|---|---|---|
| 5,128,926 A * | 7/1992 | Perlman et al. ............. | 370/410 |
| 5,748,628 A * | 5/1998 | Ericson et al. ............. | 370/384 |
| 5,914,956 A | 6/1999 | Williams | |
| 5,953,335 A | 9/1999 | Erimli et al. | |
| 6,072,809 A * | 6/2000 | Agrawal et al. ............ | 370/503 |
| 6,094,435 A * | 7/2000 | Hoffman et al. ............ | 370/414 |
| 6,101,188 A * | 8/2000 | Sekine et al. ............... | 370/401 |
| 6,104,696 A * | 8/2000 | Kadambi et al. ........... | 370/392 |
| 6,571,291 B1 * | 5/2003 | Chow ......................... | 370/392 |

FOREIGN PATENT DOCUMENTS

| EP | 2 753 323 | 3/1998 |
|---|---|---|
| WO | WO 99 00750 | 1/2000 |

OTHER PUBLICATIONS

LAN MAN Standards Committee Of the IEEE Computer Society, "Information Technology- Telecommunications and Information Exchange Between Systems- Local and Metropolitan Area Networks- Common Specifications- Part 3: Media Access Control (MAC) Bridges", ISO/IEC 15802-3: 1998 ANSI/IEEE STD 802.ID, 1998 Edition, Dec. 10, 1998, pp. 42-46, XP002159252.

* cited by examiner

*Primary Examiner*—Ricky Ngo
*Assistant Examiner*—Derrick W Ferris
(74) *Attorney, Agent, or Firm*—Manelli Denison & Selter PLLC; Leon R. Turkevich (57) ABSTRACT

A network switch, configured for performing layer 2 and layer 3 switching in an Ethernet (IEEE 802.3) network without blocking of incoming data packets, includes a network switch port having a packet classifier module configured for evaluating an incoming data packet on an instantaneous basis. The packet classifier module performs simultaneous comparisons between the incoming data stream of the data packet and multiple templates configured for identifying respective data protocols. Each template is composed of a plurality of min terms, wherein each min term specifies a prescribed comparison operation within a selected data byte of the incoming data packet. Hence, the packet classifier module is able to monitor data flows between two network nodes interacting according to a prescribed network application. The packet classifier module determines the application state for a prescribed network application from a received layer 2 data packet, enabling switching logic within the network switch to utilize application-specific aging intervals for respective network applications such as HTTP, SNMP, ftp, Telnet, etc. in order to delete aged address entries from a network switch address table based on the supported network application. Determination of the application state from the received layer 2 data packet also enables the network switch to detect the end of a data flow for deletion of the corresponding address entry from the network switch address table.

13 Claims, 5 Drawing Sheets

SELECTIVE ADDRESS TABLE AGING IN A NETWORK SWITCH BASED ON APPLICATION STATE DETERMINED FROM A RECEIVED DATA PACKET

BACKGROUND OF THE INVENTION

1. Field of the Invention

The present invention relates to switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

One problem with existing layer 2 type network switches involves use of aging functions having a fixed aging interval, set by a user, to delete aged address entries from network switch address table. In particular, a network switch "learns" new network addresses by adding new address entries to the network switch address table upon detecting a received data packet having an unknown address, for example an unknown MAC source or destination address. The network switch also includes an aging function to delete aged address entries to prevent the network switch address table from overflowing. For example, a switch fabric of a network switch may set within an address entries a "hit bit" each time the address entry is accessed for switching a received data packet. The aging function, in response to detecting a set "hit bit", resets the bit to zero and maintains the address entry within the network switch address table; if the aging function detects that the "hit bit" is already reset to a zero value, indicating that the address entry has not been accessed for at least the fixed aging interval, the aging function delete the aged address entry from the network switch address table.

Use of the above-described aging function, however, may cause premature deletion of an address entry from the network switch, requiring the network switch to relearn the network addresses.

For example, the layer 2 switch, unaware that a higher-protocol communication (i.e., flow) is occurring between two network applications, may repeatedly delete and relearn the address entries for the data packets associated with the flow between the two network applications if the user-defined aging interval is set at too short a value, wasting network switch resources. Attempts to increase the user-defined aging interval, however, may risk overflowing the network switch address table.

SUMMARY OF THE INVENTION

There is a need for an arrangement that enables a network switch to selectively delete address entries from its network switch address table, while minimizing relearning of the deleted address entries.

There is also a need for an arrangement that enables a network switch to selectively delete address entries from its network switch address table based on the state of data flows transferred by the network switch between two network applications.

These and other needs are attained by the present invention, where a network switch selectively deletes an address entry from a network switch address table based on a determined application state of a data flow from a received data packet.

One aspect of the present invention provides a method in an integrated network switch, the method comprising determining an application state for a prescribed network application from a received layer 2 data packet, and selectively deleting an address entry from a network switch address table that specifies at least one of a source of the received layer 2 data packet and a destination of the layer 2 data packet, based on the determined application state. The determining of an application state by the integrated network switch enables the integrated network switch to identify the presence of data flows between network nodes according to the prescribed network application, enabling the integrated network switch to adjust aging timers according to the prescribed network application parameters. Moreover, the selective deletion of the address entry based on the determined application state enables the integrated network switch to delete the address entry upon determining from the application state that the data flows between the network nodes is terminated, for example at the end of a session between the two nodes. Hence, the deletion of address entries can be precisely controlled based on the completion of a network application session, as determined by the application state from the received layer 2 data packet.

Another aspect of the present invention provides a network switch, comprising network switch ports and switching logic. The network switch ports each include a packet classifier configured for determining an application state for a detected one of a plurality of a prescribed network applications from a received layer 2 data packet. The switching logic is configured for selectively deleting an address entry that specifies at least one of a source of the received layer 2 data packet and a destination of the layer 2 data packet, based on one of the determined application state and a determined inactivity of the address entry during an application-specific aging interval, where the application-specific aging interval is based on the detected one prescribed network application. Hence, the switching logic selectively deletes an address entry based on an interval of inactivity based on the one prescribed network application detected from the received layer 2 data packet, enabling utilization of more precise aging intervals based on the network application being supported by the integrated network switch; alternately, the switching logic selectively deletes the address entry based on the determined application state, enabling the switching logic to delete the address entry upon completion of a session between two network nodes according to the detected one prescribed network application.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment is directed to an arrangement in an integrated network switch for generating application-based aging intervals for network switch address table entries, and selectively deleting an address entry based on an application state determined for a prescribed network application from a received layer 2 data packet. The detection of a prescribed network application from a received layer 2 data packet, as well as the application state for the prescribed network application, is performed by a packet classifier module within the network switch port having received the layer 2 data packet. A description will first be provided of the network switch architecture and the packet classifier, followed by a description of the application-based aging of the network switch address entries.

Figure 1:
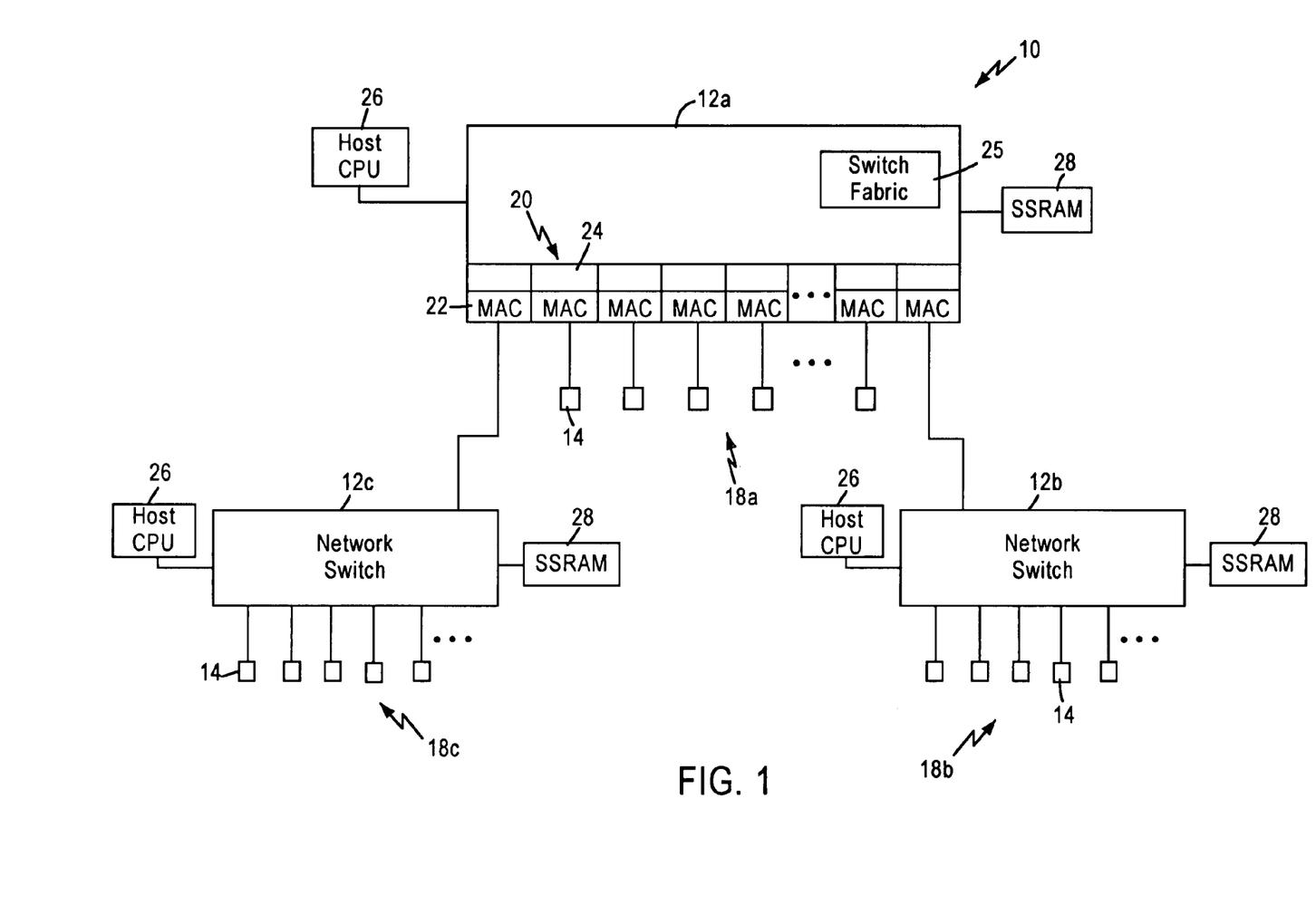
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25 and the packet classifier, described below. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice.

According to the disclosed embodiment, the packet classifier module 24 of FIG. 1 is configured for multiple simultaneous comparisons between the incoming data stream and templates that identify the data format of the incoming data stream. Specifically, users of the host processor 26 will specify policies that define how data packets having certain prescribed data values at selected portions of a received data packet should be handled by the switch fabric 25. These policies are implemented by loading into the switch fabric 25 a set of frame forwarding decisions, or aging function parameters, for each corresponding policy. Note that the prescribed data values at selected portions of the received layer 2 data packet may be located within any portion of the layer 2 data packet. Hence, the packet classifier module 24 is able to detect the presence of data flows according to different network applications, for example hypertext transport protocol, SNMP, FTP, Telnet, etc.

Hence, the switch fabric 25 could include one set of frame forwarding instructions and aging parameters for an HTTP packet, another set of frame forwarding instructions and aging parameters for an SNMP packet, and another set of frame forwarding instructions and aging parameters for a high-priority packet (e.g., video, or voice, etc.).

Figure 2:
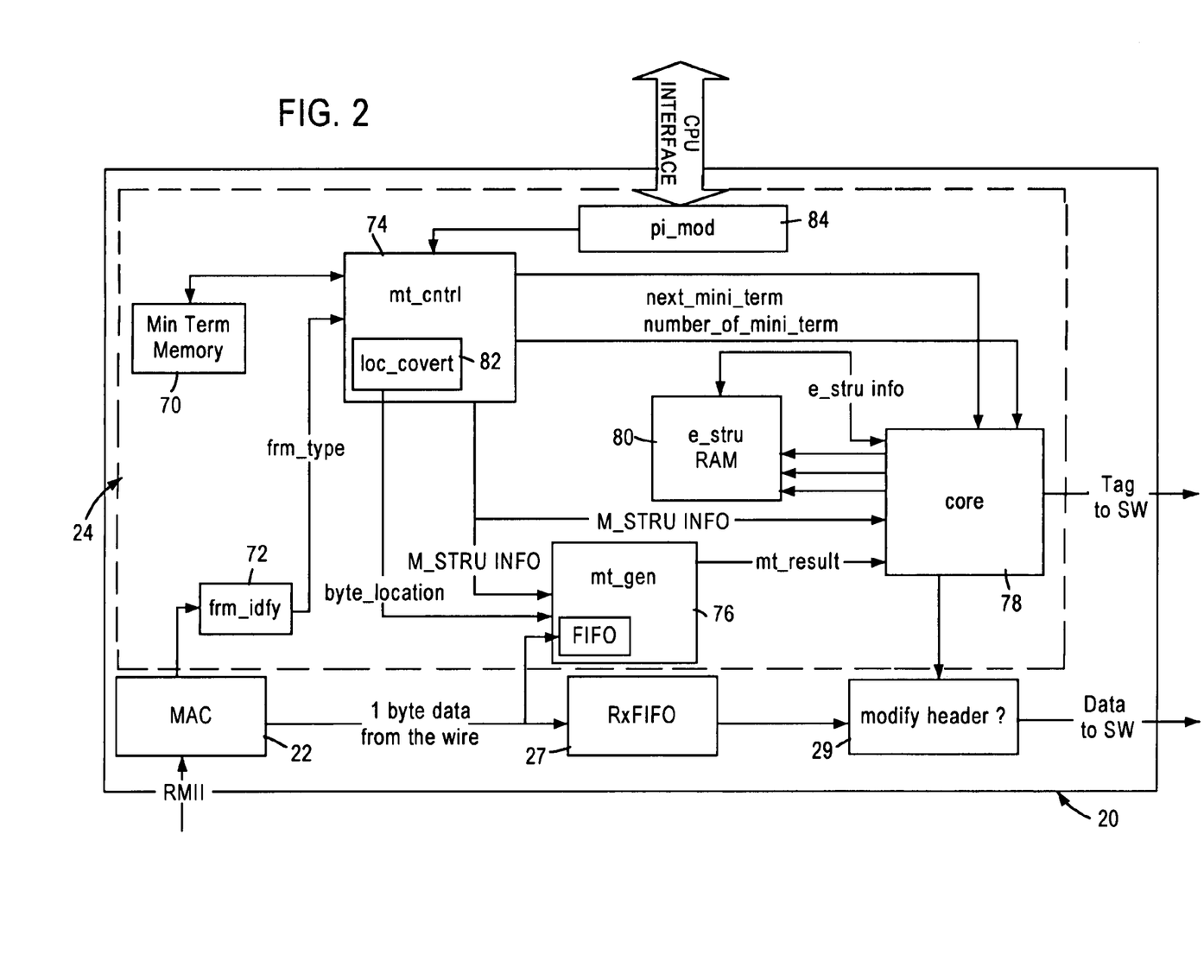
FIG. 2 is a block diagram illustrating the network switch port of FIG. 1, including the packet classifier module, according to an embodiment of the present invention.

FIG. 2 is a block diagram illustrating the packet classifier module 24 according to an embodiment of the present invention. As shown in FIG. 2, the network switch port 20 includes a MAC 22, a receive FIFO buffer 27, a header modifier 29, and the packet classifier module 24. The packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received. Specifically, the packet classifier module 24 simultaneously compares the incoming data packet with a plurality of templates configured for identifying respective data formats. The packet classifier module 24, based on the comparison between the incoming data packet and the plurality of templates, identifies an equation to be executed that specifies the tag to be supplied to the switch fabric 25.

Specifically, the packet classifier module 24 generates a comparison result that identifies the incoming data packet by detecting at least one matched template from a plurality of templates. The packet classifier module 24 then identifies which of the equations includes the matched template, and generates the tag specified by the equation.

Figure 3A:
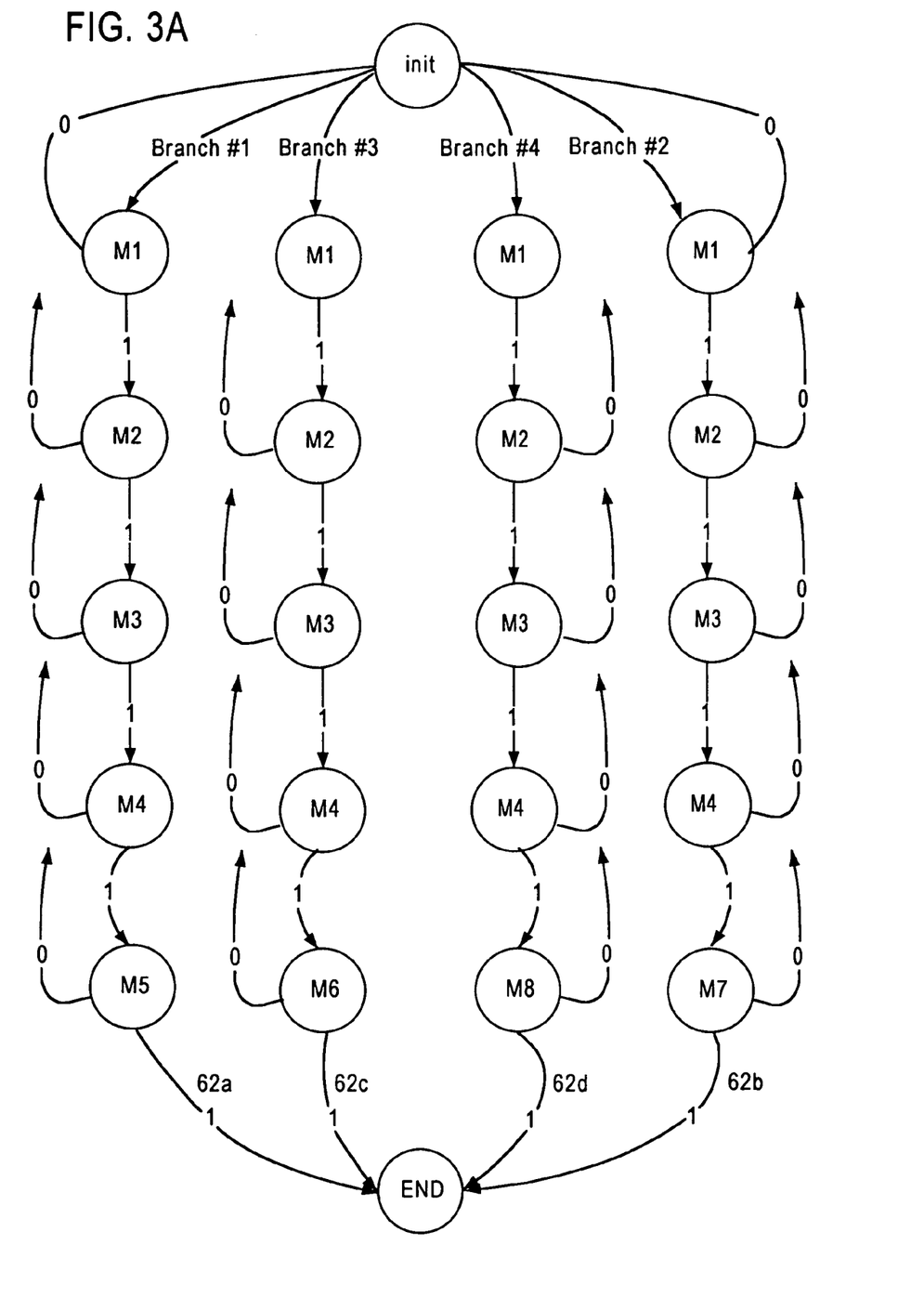
FIGS. 3A and 3B are diagrams illustrating simultaneous processing of four templates of an equation by the min term generator of FIG. 2.
Figure 3B:
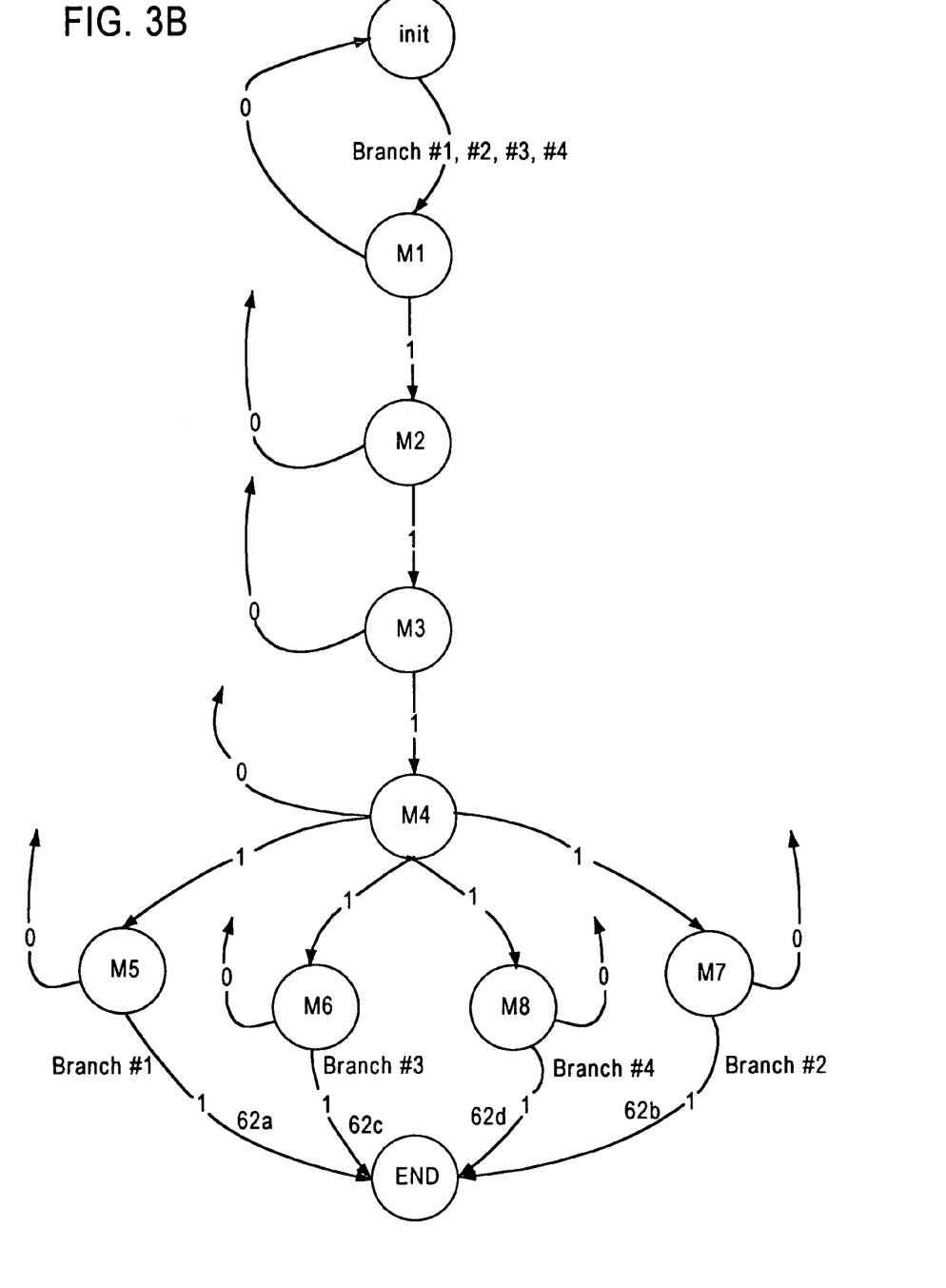

FIGS. 3A and 3B are diagrams illustrating the simultaneous processing of two templates of an equation by the packet classifier module 24. FIG. 3A illustrates the logical evaluation by the packet classifier module 24 of the equation:

$$Eq1 = M1*M2*M3*M4*(M5+M6+M7+M8).$$

FIG. 3B illustrates how the equation Eq1 would actually be stored in the min term memory 70. The equation Eq1 includes four templates 62a, 62b, 62c, and 62d: the template 62a includes the min terms M1, M2, M3, M4, and M5; the template 62b includes the min terms M1, M2, M3, M4, and M6; the template 62c includes the min terms M1, M2, M3, M4, and M7; and the template 62d includes the min terms M1, M2, M3, M4, and M8. Each template 62 corresponds to a specific IP data format recognizable based on the header of the IP data packet 32. For example, templates 62a and 62c may be configured for identifying an HTTP packet, and templates 62b and 62d be may be configured for identifying an SNMP packet. Specifically, an HTTP packet is identified if it is in IPv4 format, the time to live field in IP is bigger than one, the protocol field in IP header is TCP, header checksum is correct, source TCP port is 80 or destination TCP port is 80. An SNMP packet is identified if it is in IPv4 format, the time to live field in IP is bigger than one, the protocol field in IP header is TCP, header checksum is correct, source TCP port is 25 or destination TCP port is 25.

Hence, the following min terms may be established to represent all the above-described criteria:

M1=packet is in IPv4 format
M2=time to live field in IP is bigger than one
M3=protocol field in IP header is TCP
M4=header checksum is correct
M5=source TCP port is 80
M6=destination TCP port is 80
M7=source TCP port is 25
M8=destination TCP port is 25

Hence, the templates 62a and 62c identifiy HTTP packets, and the templates 62b and 62d identify SNMP packets. Thus, equation one (Eq1) specifies that a specific result (e.g., the tag having a specified value) should be output to the switch fabric 25 if either template 62a, 62b, 62c, or 62d are true.

Moreover, the min terms M1 . . . M8 are arranged within the associated templates 62a and/or 62b in a prescribed order that corresponds to the relative position of a data byte in the incoming data stream.

The min term M1 is configured for comparison with the first byte (B1) of the IP packet, the min term M2 is configured for comparison with a subsequent byte (B2) of the IP packet that follows B1, the min term M3 is configured for comparison with a subsequent byte (B3) that follows B2, etc. Hence, the use of templates 62 having min terms in an order based on the relative position of a data byte in the incoming data stream enables multiple simultaneous comparisons between the incoming data stream and min terms. Hence, an incoming data packet can be compared to multiple templates to determine not only the data format of the incoming data packet, but also what action needs to be performed by the switch fabric 25.

As shown in FIG. 2, the packet classifier 24, also referred to as a network switch port filter, includes a min term memory 70 for storing the min term values (e.g., M1, M2, etc.), and a frame identifier 72 configured for identifying the type of layer 2 frame being received; in particular, identifying the type of layer 2 frame being received (e.g., Ethernet, IEEE 802 to 3, etc.) enables identification of the start position 64 of the IP packet 32 within the layer 2 packet 30. The packet classifier 24 also includes a min term controller 74, a min term generator 76, an equation core 78, and an evaluation results memory 80. A processor interface module (pi_mod) 82 is used for transferring the generated min terms from the host CPU 26 into the min term memory 70.

The min term controller 74 is configured for fetching the min terms from the min term memory 70 corresponding to a selected byte of the received IP frame. The min term controller 74 also includes a location converter configured for specifying the actual byte location (byte_location) of the start point in response to receiving a frame type (frm_type) signal from the frame identifier 72 that specifies the type of layer 2 frame. The min term controller 74 then forwards the min term values (M_STRU INFO) to the min term generator 76 and the equation core 78.

The min term generator 76 performs the actual min term comparisons between the min terms fetched by the min term controller and the selected byte of the incoming data stream, and provides the min term comparison results (mt_result) to the equation core 78. According to the disclosed embodiment, the min term generator is configured for simultaneously comparing the incoming data stream to up to eight min terms. The equation core 78 is configured for generating a frame tag based on the min term comparison results received from the min term generator 76, relative to the relevant templates 62.

As described above, the packet classifier module 24 enables each network switch port 20 to identify whether the received layer 2 data packet is carrying frame data for a prescribed network application, such as HTTP, SNMP, FTP, Telnet, etc. In addition, the packet classifier module 24 can be programmed with additional templates to specifically identify, from the received layer 2 data packet, the application state. Specifically, network nodes communicate according to the prescribed network application, resulting in pre-scribed data flows between the two network nodes; hence, the layer 2 data packets transferred between the network nodes will include payload information that specifies the prescribed network application state, for example a request to initiate a session, acknowledgment, communication during the session, a request to terminate the session, and acknowledgment of termination of the session. The packet classifier module 24 can be programmed with the appropriate templates to monitor the state of the data flow by evaluating the payload data of the layer 2 data packets; hence, the packet classifier module 24 can monitor the application state for the network application operating between the two network nodes, enabling the switching logic within the switch fabric 25 to perform application-based aging operations.

Figure 4:
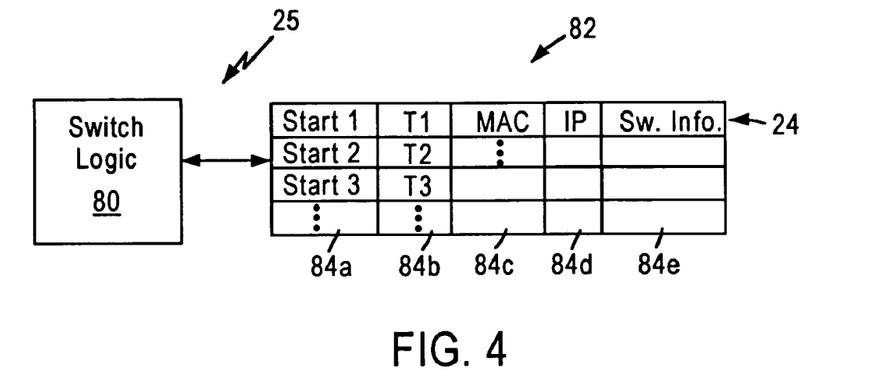
FIG. 4 is a diagram illustrating in detail the switching logic of FIG. 1.

FIG. 4 is a diagram illustrating in detail the switch fabric 25 of FIG. 1 according to an embodiment of the present invention. As shown in FIG. 4, the switch fabric 25 includes switching logic 80 and a network switch address table 82. Note that the network switch address table 82 may also be implemented external to the network switch 12 as an external address table. The switching logic 80 controls the learning (i.e., storing) of address table entries 84 within the network switch address table 82.

Each address table entry 84 includes a MAC address field 84c, an IP address field 84d, and a switching information field 84e that provides corresponding layer 2 and/or layer 3 switching information for the network node having the corresponding MAC and/or IP addresses. Each address table entry 84 also includes an aging timer start field 84a configured for storing a start time for an aging timer, and an aging interval field 84b configured for storing the application-specific aging time interval, based on network application being supported by the determined data flow.

Figure 5:
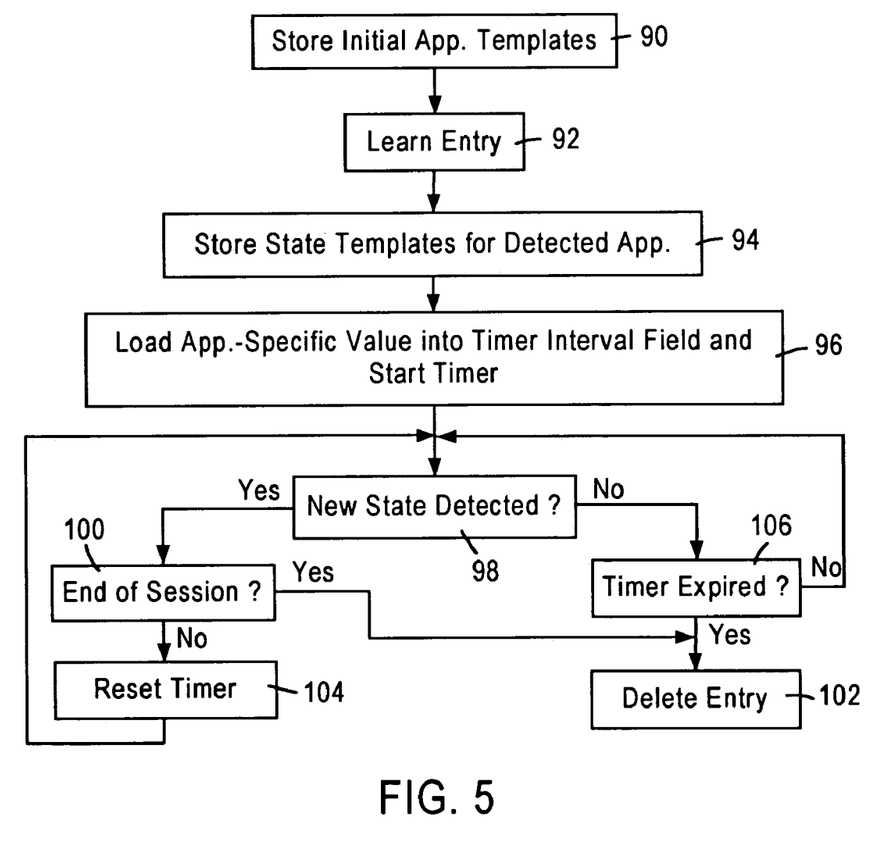
FIG. 5 is a diagram illustrating the method of selectively deleting an address entry based on determined application state and application-specific aging intervals according to an embodiment of the present invention.

FIG. 5 is a flow diagram illustrating the method of performing application-based aging of the network switch address table 82 according to an embodiment of the present invention. Although illustrated as a flow diagram, actual implementation may be state-based, where a new state in the switching logic 80 is executed in response to prescribed action tags from the packet classifier module 24.

The method begins in step 90, where the host CPU loads into the min term memory 70 of the packet classifier module 24 at least an initial set of application templates configured for identifying each of the network applications based on the received layer 2 data packet. In particular, a network node will initially transmit a request to begin a session according to one of the prescribed network applications; the packet classifier module 24, in response to detecting the initial request from the network node, sends a tag to the switch fabric 25 specifying a new network node and the corresponding identified network application. The switching logic 80 then learns the entry in step 92 by adding another entry 84 to the network switch address table 82. The host CPU is also notified of the new data flow, and the host CPU may at that time store additional templates for the detected application into the min term memory 70 in step 94, enabling the packet classifier module 24 to identify each application state for the detected data flow. Alternately, all the templates may be loaded into the min term memory 70 at one time.

In response to detecting the network application being supported by the corresponding received layer 2 data packet, the host CPU 26 loads the application-specific aging interval (e.g., T1) into the aging interval field 84b, and records the start time for the timer into the aging timer start field 84a in step 96.

The packet classifier module 24 of the network switch port 20 having received the layer 2 data packet continues to monitor for additional layer 2 data packets having payload data for the identified data flow of the network application. If in step 98 the packet classifier module 24 detects a new state for the existing data flow, and if in step 100 the new state indicates an end of a session for the data flow according to the identified network application, the packet classifier module 24 outputs an action tag specifying an end of the session to the switching logic 80, causing the switching logic 80 to delete the corresponding address table entry 84 in step 102. However if in step 100 the new state is determined by the packet classifier module 24 to be an intermediate application state, the packet classifier module 24 sends the appropriate tag to the switching logic 80, causing the switching logic 80 to reset the timer in step 104 by overriding the start time in field 84a with an updated value.

The switching logic 80 continually monitors the application-specific aging interval by comparing its internal clock to the start time entry 84a relative to the aging interval entry 84b. If the switching logic 80 determines that the application-specific timer has expired in step 106, indicating that the corresponding address table entry has not been accessed during the application-specific aging interval specified in the aging interval field 84b, the switching logic 80 deletes the entry in step 102.

According to the disclosed embodiment, application-specific aging intervals are used, in combination with determined application state, to precisely determine when an address entry should be deleted from a network switch address table. Hence, an address table may be precisely maintained by the network switch based on the data flows encountered by the network switch.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated network switch, the method comprising:
   determining an application state for a prescribed network application from a received layer 2 data packet; and
   selectively deleting an address entry from a network switch address table that specifies at least one of a source of the received layer 2 data packet and a destination of the layer 2 data packet, based on the determined application state.

2. The method of claim 1, further comprising storing within a network switch port having received the received layer 2 data packet a plurality of templates configured for identifying the application state from respective available application states of the prescribed network application.

3. The method of claim 2, wherein the storing step includes storing the plurality of templates in response to the network switch port identifying an initial one of the available application states from the received layer 2 data packet.

4. The method of claim 3, further comprising deleting the address entry from the network switch address table, following an application-specific aging interval determined by, and initiated in response to, detection of one of the available application states, based on a determined inactivity of the address entry during the application-specific aging interval.

5. The method of claim 1, wherein the selectively deleting step includes deleting the address entry based on the determined application state specifying an end of a session for the prescribed network application.

6. The method of claim 5, wherein the detecting step includes:
   comparing selected portions of the received layer 2 data packet to a plurality of min terms, that specify frame data used to identify the end of the session for the prescribed network application, during reception of the received layer 2 data packet;
   determining whether the selected portions of the received layer 2 data packet match the respective min terms; and
   generating a comparison result based on the determining step.

7. The method of claim 1, wherein the determining step includes determining the application state for the prescribed network application from a plurality of available prescribed network applications, based on simultaneously comparing the received layer 2 data packet to multiple templates that specify frame data used to identify the respective available prescribed network applications.

8. The method of claim 1, further comprising:
initiating an application-specific aging timer configured for counting an application-specific aging interval for the address entry in response to determining the application state; and
deleting the address entry if the address entry is not accessed upon expiration of the application-specific aging interval.

9. The method of claim 8, further comprising resetting the application-specific aging timer in response to detecting and access of the address entry during the application-specific aging interval.

10. A network switch, comprising:
network switch ports, each including a packet classifier configured for determining an application state for a detected one of a plurality of prescribed network applications from a received layer 2 data packet; and
switching logic configured for selectively deleting an address entry that specifies at least one of a source of the received layer 2 data packet and a destination of the layer 2 data packet, based on one of the determined application state and a determined inactivity of the address entry during an application-specific aging interval based on the detected one prescribed network application.

11. The switch of claim 10, wherein the switching logic includes a programmable timer configured for initiating counting of the application-specific aging interval for the address entry in response to detection of the application state from the received layer 2 data packet.

12. The switch of claim 10, wherein the switching logic includes a second programmable timer configured for counting a second application-specific aging interval for a second address entry.

13. The switch of claim 12, further comprising a network switch address table configured for storing the address entry for the received layer 2 data packet and the second address entry.

* * * * *